Sept. 14, 1937.  C. G. OLSON  2,093,171
TAPPING SCREW
Filed Jan. 27, 1933  2 Sheets-Sheet 1
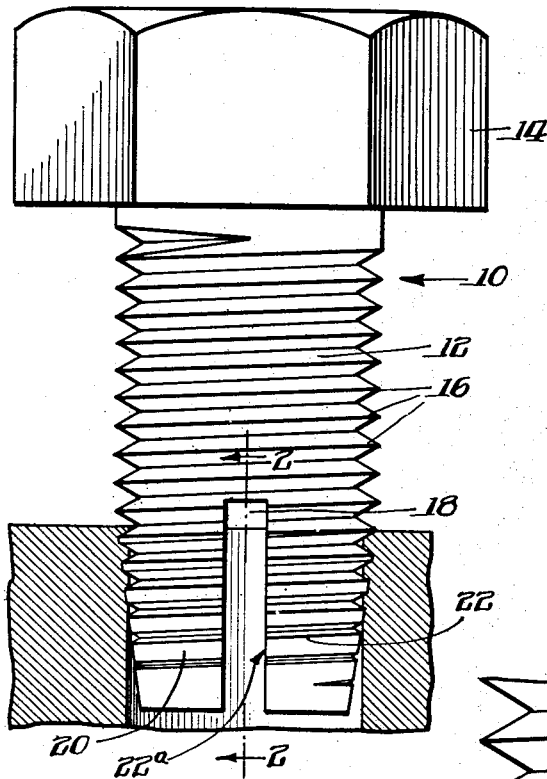
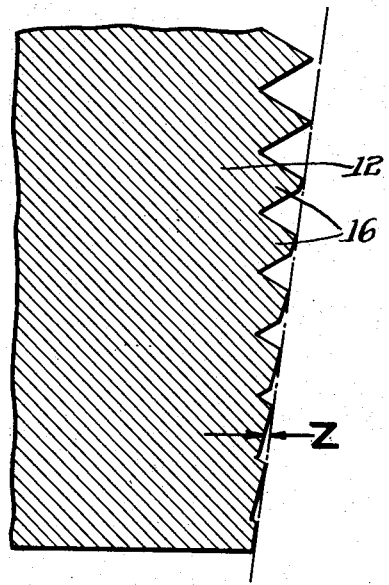
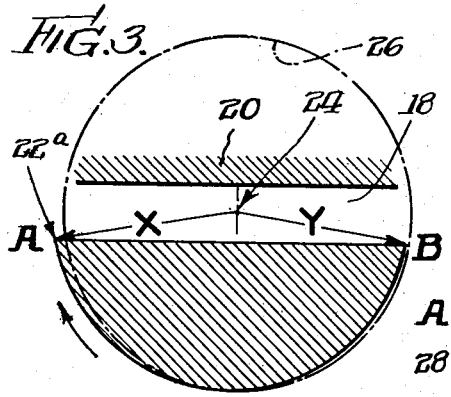
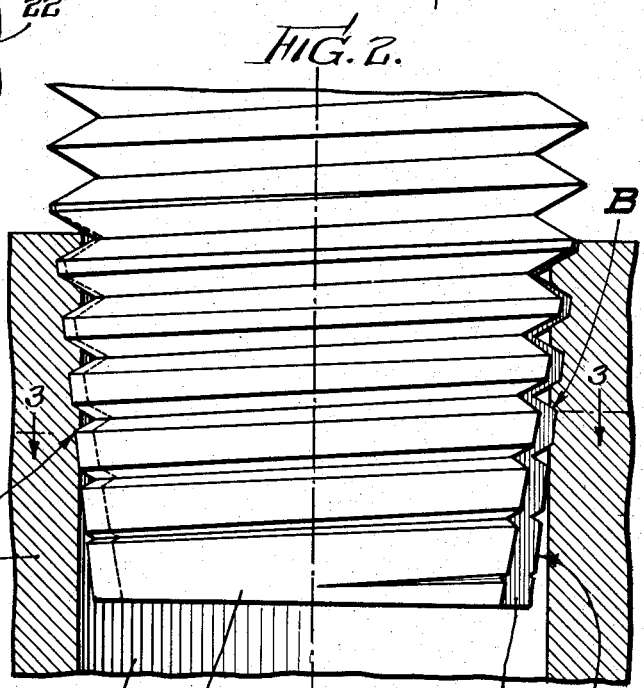
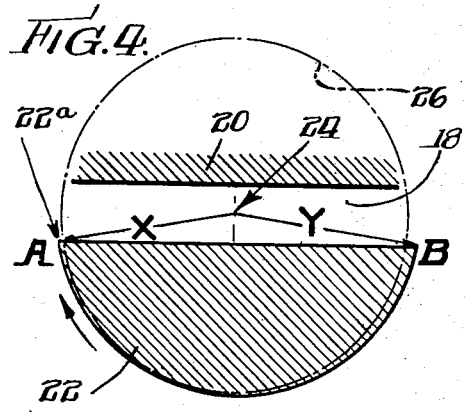
Inventor:
Carl G. Olson
By: Cox & Moore
attys Sept. 14, 1937. C. G. OLSON 2,093,171
TAPPING SCREW
Filed Jan. 27, 1933 2 Sheets-Sheet 2
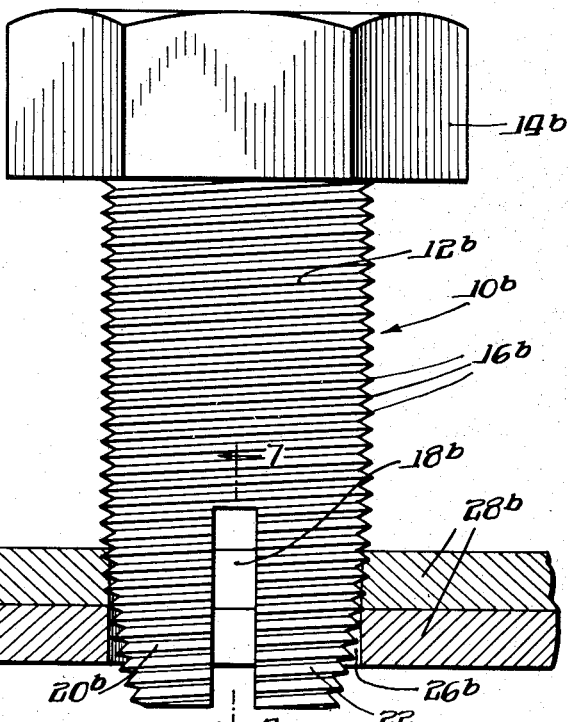
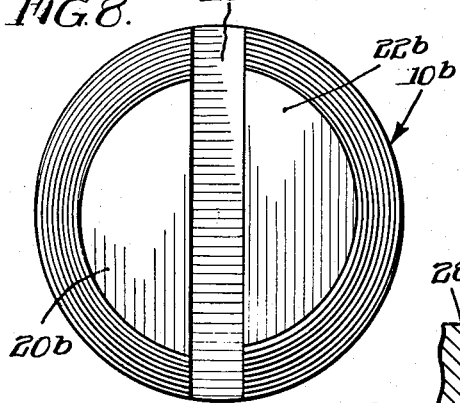
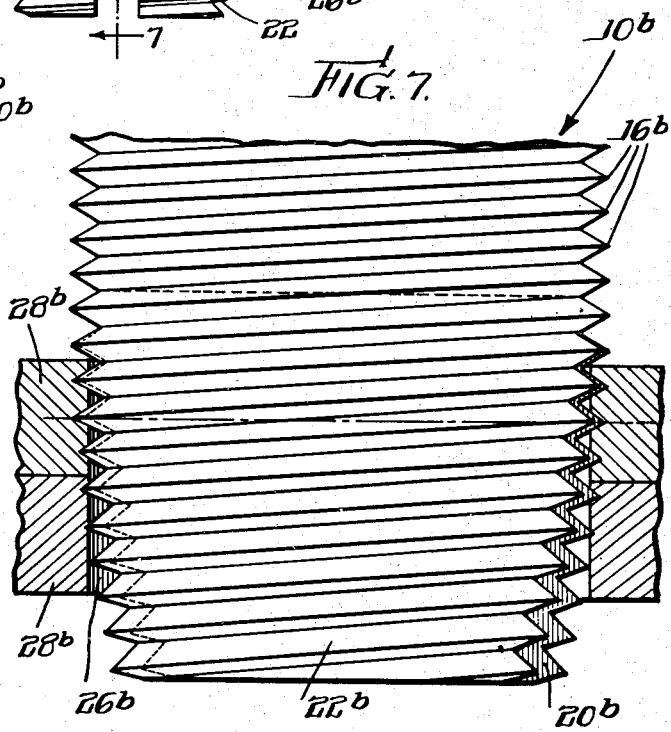
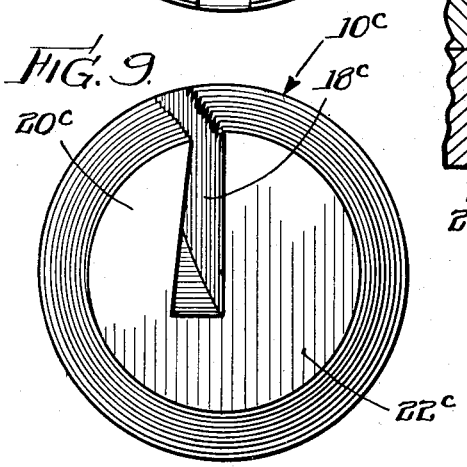
Inventor
Carl G. Olson
By: Cox & Moore
attys Patented Sept. 14, 1937

2,093,171

UNITED STATES PATENT OFFICE 2,093,171

TAPPING SCREW

Carl G. Olson, Chicago, Ill., assignor to Illinois Tool Works, Chicago, Ill., a corporation of Illinois Application January 27, 1933, Serial No. 653,846

22 Claims. (Cl. 85—47)

My invention relates generally to screw fasteners, and particularly to fasteners of the type adapted to form or cut their own thread in the unthreaded aperture of a work piece.

This application is a continuation in part of application, Serial No. 591,272, filed February 6, 1932.

It is one of the primary objects of my invention to provide a tapping screw or fastener, in which the aggressiveness of the screws, in gripping or taking within the work piece during the initial application thereto, is materially increased.

More specifically, my invention contemplates the provision of a tapping screw or fastener, as above set forth, in which the cutting effectiveness of a serrated edge in the screw is greatly increased, and to this end I propose to dispose said cutting edge with respect to the body of the screw so as to cause said edge to more effectively and aggressively dig into the wall of the unthreaded aperture of the work piece as the screw is initially applied.

Still more specifically, my invention contemplates the provision in a tapping screw of the type set forth above, of a recess which extends transversely of the screw thread to present a cutting edge, the portion of the screw body adjacent said edge being laterally displaced with respect to the screw axis, whereby to increase the cutting effectiveness of said edge when the screw is initially inserted within the aperture of a work piece.

Still another and more specific object of my invention is the provision of a tapping screw or fastener, in which the entering end is formed with a slot which completely traverses the screw body, and provides a pair of diametrically positioned cutting edges, the sections of the body separated by the slot or recess being laterally displaced whereby to increase the cutting effectiveness of said edges when the screw is initially applied to the work piece.

A further object of my invention is to provide a tapping screw or fastener which is so designed as to materially reduce frictional resistance which has heretofore been experienced in the initial application of tapping screws to a work piece, said frictional resistance resulting from the frictional engagement of the thread in the screw with the complementary thread formed in the work piece.

The foregoing and numerous other objects and advantages will be more apparent from the following detailed description when considered in connection with the accompanying drawings, wherein—

Figure 1 is a side elevational view of a screw embodying features of my invention, the same being shown partially inserted within the aperture of a work piece;

Figure 2 is an enlarged transverse sectional view similar to Figure 1 and taken substantially along the line 2—2 of Figure 1, the screw being shown in elevation for the purpose of more clearly illustrating the structural characteristics thereof;

Figure 3 is a transverse sectional view of the forward screw section in Figure 2, said view being taken substantially along the line 3—3 of Figure 2;

Figure 4 is a section similar to that shown in Figure 3, of a screw in which the sections separated by the slot are not laterally displaced;

Figure 5 is an enlarged fragmentary sectional view of a screw provided with a modified thread construction at its entering end;

Figure 6 is an elevational view of a modified tapping screw fastener equipped with a multiple thread, which is smaller than the conventional standard machine screw thread;

Figure 7 is an enlarged fragmentary view taken substantially along the line 7—7 of Figure 6, the screw being shown in elevation for the purpose of more clearly illustrating the structural and functional characteristics thereof;

Figure 8 is a bottom view of the screw shown in Figure 6; and

Figure 9 is a bottom view of a modified screw equipped with a slot which does not completely traverse the screw body, but has a section normally displaced inwardly to render the cutting edge of the companion section more effective.

Referring now to the drawings more in detail wherein like numerals have been employed to designate similar parts throughout the various figures, it will be seen that one embodiment of my invention contemplates a tapping screw or fastener designated generally by the numeral 10. This fastener includes a threaded body 12 which is preferably hardened and is provided with a suitable head 14 at one end thereof. The thread 16 on said body is uniform in root diameter over the entire length of the screw, and a portion of the thread toward the entering end of the screw gradually decreases in height until it finally fades away at the entering extremity of the screw.

Completely traversing and positioned medially of the screw body at the entering end thereof is a recess or slot 18. This slot 18 divides the screw body into a pair of sections 20 and 22. In the disclosed embodiment, these sections are normally displaced with respect to each other, as clearly shown in Figure 2. It will be seen in Figure 2 that the section 22 is displaced or deflected slightly to the left of the screw axis 24, while the other section 20 is displaced to the right of said axis.

The slot 18, in traversing the thread 16 at the entering end of the screw, presents a toothed or serrated cutting edge 20a, Figure 2, on the screw section 20 and a diametrically positioned cutting edge 22a, Figures 1 and 3. By reason of the fact that the sections 20 and 20a are displaced laterally in opposite directions, their respective cutting edges 20a and 22a are exposed as shown in Figure 2. Thus, when the screw is initially inserted within an aperture 26 of a work piece 28, the cutting effectiveness of these edges is materially increased, thereby increasing the aggressiveness with which the screw takes or grips within the aperture of the work piece. This construction is to be distinguished from a screw in which the screw sections are not normally displaced laterally.

At this point I wish to make reference to the patent to George C. Trotter, No. 1,862,486, wherein a screw is disclosed which is of the same general type as that disclosed herein, inasmuch as it is designed to cut its own thread within a work piece. In that patent the cutting edge presented along the slot is not normally displaced laterally with respect to the screw body in the manner disclosed in the present application. My invention contemplates the pre-positioning of the cutting edge in such a manner as to aggressively present said edge to the work upon the initial application of the screw.

It is common practice in the use of tapping screws to employ apertures in the work piece, which are larger in diameter than the root diameter of the screw, as clearly indicated in Figures 1 and 2. Thus, when the screw is initially applied to the aperture, a portion of the screw will enter the aperture before the thread actually grips or takes. While a full thread is not formed in the work piece, this thread is of sufficient fullness to effectively hold the screw in place. The fact that the screw cuts its own thread in the work causes the complementary thread in the screw and work piece to have a very close fit, and this compensates for any lack of completeness or fullness in the thread formed in the work piece.

Another advantageous feature which my invention presents is that of reducing, and, in fact, practically eliminating frictional resistance between the complementary threads in the screw and work piece. This frictional resistance which must be overcome by the turning torque applied to the screw as it is initially tightened within the work piece, will be more readily appreciated when consideration is given to the action of a slotted tapping screw which is not provided with the displaced screw sections, such as the screw sections 20 and 22 described above.

Assume that these sections were not displaced before the screw was inserted in the aperture 26. Assume further, for the purpose of illustration, that the cutting edge 22a in the undisplaced screw section 22 begins to cut within the wall of the work piece 28. I have illustrated the action of such a construction in Figure 4. This figure discloses a transverse section of the section 22 as it would appear along the section line 3—3 of Figure 2 if the sections 20 and 22 occupied normally undisplaced positions. The aperture 26 is indicated by the circular dot-and-dash line in Figure 4, and the screw is rotated as indicated by the directional arrow. Obviously the cutting action takes place along the edge 22a. In Figure 4 I have designated the position at which the edge 22a is cutting by the letter A, and the position occupied by diametrically disposed portion of the screw thread, by the letter B. Due to the tapered construction of the entering end of the screw thread, it will be apparent that, in moving along the thread from the point A to the point B, the radius of the screw increases. Thus the radius of the screw at point A designated by the letter X is less than the radius at the point B designated by the letter Y, Figure 4. Thus, as the screw continues to rotate so as to bring the point B to the position now indicated by the letter A, sufficient turning torque must be applied to overcome the resistance, due to the increase in radius, or, in other words, to overcome the crowding action of the thread in the screw in moving from the point B to the point A. This same effect is produced in the screw sections 20a, but for purposes of illustration I have confined my description to the screw section 22.

By employing my improved construction wherein the screw sections 20 and 22 are normally displaced laterally with respect to the screw axis, as indicated in Figures 2 and 3, it will be seen that the crowding action or increased frictional resistance described above is obviated. The cutting edge 22a is not only exposed and thereby more effectively presented to the work piece so as to increase the aggressiveness with which it causes the screw to be drawn into the work piece, but also the crowding action of the thread is eliminated, due to the fact that the radius as indicated by the letter X in Figure 3, as it progresses to the radius Y decreases as distinguished from the increase in the radii of Figure 4. Thus, as the point B is rotated to the position now designated as point A of Figure 3, no binding or crowding action of the screw thread in the work piece takes place. By having the screw sections 20 and 22 properly displaced, I can either introduce clearance between the screw thread and the complementary thread of the work piece, as indicated in Figure 3, or I can maintain a close sliding fit between the complementary thread sections without introducing any binding or crowding effect. By employing my improved construction, the rotative torque heretofore required to overcome the frictional resistance encountered as a result of the crowding of the screw thread within the work piece is eliminated. Furthermore, the increase in cutting or gripping effectiveness of the cutting edges 20a and 22a is increased to such an extent as to minimize the longitudinal force required to initially insert the screw in the work.

It is a common practice in assembly work, for example, in assembling automobile parts on a production basis, for the workmen to employ a power driven screw driver. While the operator, under such circumstances, is not called upon to physically exert a rotative force to the screw, he is required to guide the screw as it enters the opening in the work piece. If, in addition to properly guiding and directing the screw, he is required to exert considerable force in order to cause the entering thread sections to grip the work with sufficient aggressiveness to pull the screw in, his efficiency is materially handicapped. With my improved construction, the workman need exert no greater force on larger sizes of screws than on the smaller sizes, due to the fact that the displaced cutting edges 20a and 22a initially grip the work piece with sufficient aggressiveness. Not only is the axial force required to initially insert the screw within the work piece materially reduced, but also the force required to rotate the screw. Thus, the possibility of shearing or snapping off the screw head during its insertion is prevented.

In Figure 5 I have shown a modified thread construction wherein the flattened crown of the thread at the entering end of the screw is relieved, as indicated by the angle Z in Figure 5. Instead of the entire crown or outer surface of the thread being parallel to the dot-and-dash line of Figure 5, only the apices presented at the upper side of each thread are positioned in alinement as indicated by said dot-and-dash line. By relieving the crown of the thread, as indicated by the angle Z, the aggressiveness of the thread in initially gripping the work, is increased.

In Figures 6 to 8 inclusive I have disclosed a modified screw construction, said screw being indicated generally by the numeral 10b. This screw includes a body 12b having a head 14b provided at one end thereof. The body 12b is equipped with multiple threads 16b which are smaller than the standard machine screw thread which would normally be employed on a screw of the size shown in Figure 6. In other words, if the screw 10b were to be provided with the conventional United States standard machine screw thread, said thread would be considerably larger than the threads 16b.

The size of the thread in a screw is of considerable importance when the screw is to be employed as a tapping screw. It will be seen in both Figure 6 and Figure 7 that, when screw threads, such as the relatively fine threads 16b are employed, relatively thin sheets or work pieces 28b may be more effectively secured together. That is to say, the smaller the thread, the greater number of bites or thread helices will be made in each work piece, and hence a firmer or tighter fit between the work piece and the screw will be obtained. It will be seen in Figures 6 and 7 that at least three thread helices on the screw are adapted to bite into each of the work pieces 28b. In comparison with a standard screw thread which is designed for a screw of the size shown in the drawings, it will be clear that my improved fine thread arrangement will have increased locking or tightening effectiveness.

Traversing the entering end of the screw 10b is a slot 18b which divides the screw into a pair of sections 20b and 22b. These sections 20b and 22b are normally displaced laterally with respect to the screw axis, as clearly shown in Figures 7 and 8 in the same manner as the previously described screw sections 20 and 22 shown in Figures 1 and 2. When the screw is initially inserted within the unthreaded aperture 26b, the oppositely disposed cutting edges presented by the screw sections 20b and 22b form threads within the work piece. It will be seen that the threads on the screw 10b are so arranged that the crest on one side of the screw is diametrically opposite the crest on the other side of the screw. This is clearly indicated by the dot-and-dash line in Figure 7. Thus, when the screw is initially inserted within the work, the possibility of canting is materially reduced. That is to say, a crest or crown on one side of the screw is positioned diametrically opposite a similar crest or crown on the other side thereof to more effectively guide and position the screw when it is initially inserted within the aperture of a work piece.

It will also be noted that while the entering end of the screw decreases in diameter, the thread extending along said decreasing portion remains constant in height. This is to be distinguished from the construction shown in Figures 1 and 2, wherein the height of the thread constantly decreases toward the entering end of the screw, and, in fact, the thread actually vanishes when it reaches the entering extremity. In the structure shown in Figures 6 to 8, inclusive, the thread over the entire extent of the screw is constant in size and the diameter of the entering end of the screw is less than the root diameter of the portion of the thread which extends between the head 14b and the slot 18b. This is also to be distinguished from the screw 10 wherein the root diameter of the thread remains constant and the entering end of the screw is substantially equal in diameter to the root diameter. The fact that the V-shape of the thread is constantly maintained at the entering end of the screw enables the screw to more effectively or aggressively grip the work piece when it is initially inserted.

In Figure 9 I have disclosed a still further modified screw which I have indicated generally by the numeral 10c. This screw is provided with a slot or recess 18c which extends only partially through the screw body and is positioned to one side of the screw axis. I prefer to extend this slot 18c longitudinally of the screw at substantially right angles with respect to the thread helices. Also the depth of the slot is greatest at the entering end of the screw and decreases toward the opposite end thereof. The slot 18c divides the screw into a pair of sections 20c and 22c. The section 20c is normally displaced inwardly toward the section 22c, whereby to increase the cutting effectiveness of the serrated edge presented along the section 22c. In other words, when the screw is initially applied to the work, the cutting edge along the section 22c is more effectively exposed to the work piece and thereby more aggressively cuts its way into the work. This is to be distinguished from the patent to Trotter previously referred to herein, in which neither of the screw sections separated by a longitudinal slot is normally displaced laterally with respect to the screw axis in the manner just described in connection with the screw section 20c shown in Figure 9.

From the foregoing, it will be apparent that my invention contemplates the provision of a tapping screw of improved practical construction, which requires less turning torque and the application of less longitudinal force during the initial insertion of the screw in a work piece. It will also be apparent that my invention contemplates a screw, in which the cutting edge is positioned out of circumferential alinement with the normal circular cross section of the screw body, whereby to increase the cutting effectiveness of said edge when the screw is initially applied. Furthermore, the geometric relationship of the thread helices with respect to the screw axis, as more clearly indicated in Figure 3, is such as to preclude crowding or binding of said helices during the initial cutting operation. Another manner in which this geometric relationship may be set forth is that the lengths of successive radii of the fastener, when considered from a point on the cutting edge, such as the cutting edge 22a, Figure 3, where it intercepts a thread helix, to a point, such as the point B remotely positioned with respect to the cutting edge, progressively decrease, whereby to prevent crowding of the helix within the work piece when the screw is initially turned therein. That is to say, the lengths of successive radii beginning with the radius X, Figure 3, and continuing to the radius Y, gradually decrease. The screw structures shown in Figures 6 to 9, inclusive, also present a distinct advancement over tapping screws with which I am familiar, in that the smaller or finer threads serve to more effectively grip relatively thin sheet material by presenting an increased number of starts per unit of axial length. The multiple thread construction also brings about a diametrical, balanced arrangement of the screw threads, which minimizes the possibility of canting at the time the screw is initially applied to the work piece.

It will be noted that the thread on the screw shown in Figure 6 is uniform in height on the holding and tapping portions thereof. Furthermore, the thread on the screw of Figures 6 and 7 is V-shaped in cross section and the crown thereof over the entire extent of the screw is uniform in cross sectional contour. While, for purposes of disclosure, I have shown and described the thread on the holding portion of the screw in Figure 1 and the holding and tapping portions of the screw in Figures 6 and 7, it will be understood that this term "V-shaped" is used in its broadest sense to include all of the standard V type machine screw threads. One form of standard V thread is provided with a slight flat on the top and bottom, whereas other threads are formed with a sharp V top and bottom. In other words, the term "V-shaped" relates to threads of this general type corresponding with existing standards for machine screws as shown in standard handbooks.

My invention contemplates the disclosed as well as other embodiments, wherein the portion of the screw stock adjacent the cutting edge and extending circumferentially away from said edge is disposed in the manner described herein. Obviously changes may be made without departing from the spirit and scope of my present invention.

Having thus described my invention, what I claim as new and desire to secure by Letters Patent is:

1. A tapping screw fastener including a body portion having a thread, a portion of the thread at the entering end only of the fastener gradually decreasing in height, and a cutting edge provided at the entering end of the fastener and normally positioned out of circumferential alinement with respect to the portion of the body positioned medially in advance of said edge, whereby to increase the cutting effectiveness of the edge when the screw is initially applied to a work piece, the outward positioning of the cutting edge being increased along the entering end as the height of the thread is decreased.

2. A self-tapping screw fastener body including a cylindrical threaded holding portion and a threaded tapping portion at the entering end thereof, the diameter of the thread on said tapping portion decreasing toward the entering end to facilitate the application of the screw to an aperture in the work, said tapping portion having a cutting edge positioned outside of the normal circular cross-section of the fastener body, which edge is adapted when the screw is initially inserted within the aperture of a work piece to form a thread therein.

3. A tapping screw fastener including a cylindrical threaded body portion and a tapered threaded tapping portion, a recess traversing said tapping portion and the threads thereon so as to present a cutting edge, the part of the tapered portion trailing said cutting edge having a spiral relief to increase the cutting effectiveness of said edge when the screw is initially applied to an aperture in a work piece.

4. A self-tapping screw fastener comprising an elongated body having a cylindrical holding portion terminating in a tapered tapping portion, a thread cut along the length of said body, and a plurality of cutting edges formed along the length of the tapping portion and extending to the holding portion, said edges being positioned outside of the normal circular cross-section of the fastener and adapted when the screw is initially inserted within the aperture of a work piece to form a thread therein.

5. A tapping screw fastener body including a cylindrical threaded holding portion and a tapered threaded tapping portion and a recess traversing said tapping portion and the thread thereon and terminating at said cylindrical portion to present a cutting edge, the portion of the thread extending circumferentially away from said cutting edge being eccentrically disposed with respect to the screw axis to prevent crowding of the thread helices as the screw is initially turned within the aperture of the work piece.

6. A self-tapping screw fastener body including a cylindrical threaded holding portion and a tapered threaded tapping portion in longitudinal alignment, a slot completely traversing said tapping portion and extending to and terminating at said cylindrical portion, said slot dividing the tapping portion into a pair of screw tapping sections and cutting the threads so as to provide a pair of cutting edges, said sections being displaced laterally with respect to the screw axis in a direction parallel with said slot, whereby to position said cutting edges out of alignment with the normal circular cross-section of the screw body to thereby increase the cutting effectiveness of said edges when the screw is initially applied to an aperture in a work piece and to reduce frictional resistance during the cutting operation.

7. A tapping screw fastener comprising an elongated body having a cylindrical threaded holding portion terminating in an inwardly tapering threaded tapping portion, the angle of taper of said tapping portion with respect to the axis of the screw body being gradually increased toward the work entering end of the body, and a cutting edge formed along the tapping portion positioned outside the normal circular cross-section of the body, the outward displacement of said cutting edge being increased toward the work entering end of the body proportionally to the increasing angle of taper.

8. A tapping screw fastener comprising an elongated body having a cylindrical threaded holding portion terminating in an inwardly tapering threaded tapping portion, the angle of taper of said tapping portion with respect to the axis of the screw body being gradually increased toward the work entering end of the body, and a recess traversing the tapping portion and the thread thereon to form a plurality of tapping sections, said sections being displaced laterally with respect to the screw body axis to form displaced thread cutting edges, the displacement of which increases along the tapping portion toward the work entering end of the body.

9. A self-tapping screw fastener body including a cylindrical holding portion and a tapered tapping portion, a thread of constant root diameter cut along both of said portions, producing in said tapping portion a thread, the crown width of which increases toward the entering end of the screw body, said tapping portion having a cutting edge positioned outside of the normal circular cross-section of the fastener body, which edge is adapted, when the screw is initially inserted within the aperture of a work piece, to form a thread therein, the crown of the thread in the tapping portion being tapered with respect to the taper of the tapping portion to increase the cutting action of the tapping thread.

10. A tapping screw fastener including an elongated body having a threaded cylindrical holding portion and a hardened non-burrowing threaded tapping portion at one extremity thereof, and a head connected with the opposite extremity of said body, the thread along the holding and tapping portions being V-shaped in cross section and extending from the vicinity of the head to the entering end of the fastener, the thread on the tapping portion decreasing in external diameter toward the entering end to facilitate its initial application to an unthreaded aperture in a work piece and transversely recessed so as to present a serrated cutting edge, the effective portion of said cutting edge terminating short of the head.

11. A tapping screw fastener including an elongated body having a threaded cylindrical holding portion and a hardened non-burrowing threaded tapping portion at one extremity thereof, and a head connected with the opposite extremity of said body, the thread extending from the vicinity of the head to the entering end of the fastener, the thread on the tapping portion decreasing in external diameter toward the entering end to facilitate its initial application to an unthreaded aperture in a work piece and transversely recessed so as to present a serrated cutting edge, the effective portion of said cutting edge terminating short of the head, the crown of the thread being substantially uniform in cross sectional contour.

12. A tapping screw fastener including an elongated body having a threaded cylindrical holding portion and a hardened non-burrowing threaded tapping portion at one extremity thereof, and a head connected with the opposite extremity of said body, the thread extending from the vicinity of the head to the entering end of the fastener, the thread on the tapping portion decreasing in external diameter toward the entering end to facilitate its initial application to an unthreaded aperture in a work piece and transversely recessed so as to present a serrated cutting edge, the effective portion of said cutting edge terminating short of the head, the crown of the thread being substantially uniform in cross sectional contour, the entering extremity of said tapping portion having an external diameter not greater than the root diameter of the thread on the holding portion.

13. A tapping screw fastener including an elongated body having a threaded cylindrical holding portion and a hardened non-burrowing threaded tapping portion at one extremity thereof, and a head connected with the opposite extremity of said body, the thread extending from the vicinity of the head to the entering end of the fastener, the thread on the tapping portion decreasing in external diameter toward the entering end to facilitate its initial application to an unthreaded aperture in a work piece and transversely recessed so as to present a serrated cutting edge, the effective portion of said cutting edge terminating short of the head, the thread extending along the holding portion and tapping portion being substantially uniform in height.

14. A tapping screw fastener including an elongated body having a threaded cylindrical holding portion and a hardened non-burrowing threaded tapping portion at one extremity thereof, and a head connected with the opposite extremity of said body, the thread extending from the vicinity of the head to the entering end of the fastener, the thread on the tapping portion decreasing in external diameter toward the entering end to facilitate its initial application to an unthreaded aperture in a work piece and transversely recessed so as to present a serrated cutting edge, the effective portion of said cutting edge terminating short of the head, the crown of the thread at the entering end of the tapping portion extending below the root diameter of the thread on the cylindrical portion.

15. A tapping screw fastener including an elongated body having a cylindrical holding portion provided with a machine screw thread and a hardened non-burrowing threaded tapping portion at one extremity thereof, and a head connected with the opposite extremity of said body, the thread extending from the vicinity of the head to the entering end of the fastener, the thread on the tapping portion decreasing in external diameter toward the entering end to facilitate its initial application to an unthreaded aperture in a work piece and transversely recessed so as to present a serrated cutting edge, the effective portion of said cutting edge terminating short of the head, the crown of the thread being substantially uniform in cross sectional contour.

16. A tapping screw fastener including an elongated body having a threaded cylindrical holding portion and a hardened threaded tapping portion at one extremity thereof, and a head connected with the opposite extremity of said body, the thread along the holding and tapping portions being V-shaped in cross section and extending from the vicinity of the head to the entering end of the fastener, the thread on the tapping portion decreasing in external diameter toward the entering end to facilitate its initial application to an unthreaded aperture in a work piece, said tapping portion being longitudinally recessed to provide a screw section having a cutting edge and a section yieldable for rendering said cutting edge effective when the screw is inserted within the work, the effective portion of said cutting edge terminating short of the head.

17. A tapping screw fastener including an elongated body having a threaded cylindrical holding portion and a hardened threaded tapping portion at one extremity thereof, and a head connected with the opposite extremity of said body, the thread extending from the vicinity of the head to the entering end of the fastener, the thread on the tapping portion decreasing in external diameter toward the entering end to facilitate its initial application to an unthreaded aperture in a work piece, the crown of the thread convolutions on said holding and tapping portions being substantially uniform in cross-sectional contour, said tapping portion being longitudinally recessed to provide screw sections, one having a cutting edge and the other section yieldable for increasing the effectiveness of said cutting edge when the screw is applied to the work piece, the effective portion of said cutting edge terminating short of the head, the diametrical extremities of the thread convolutions being substantially uniform in cross sectional contour.

18. A tapping screw fastener including an elongated body having a threaded cylindrical holding portion and a hardened non-burrowing threaded tapping portion at one extremity thereof, and a head connected with the opposite extremity of said body, the thread along the holding portion being V-shaped in cross-section and extending from the vicinity of the head to said tapping portion, the continuing thread on the tapping portion decreasing in external diameter toward the entering end to facilitate initial application to an unthreaded aperture in a work piece and peripherally relieved at an angle with respect to the enveloping surface of said tapping portion, thread convolutions on said tapping portion being traversed by a recess so as to present a series of cutting teeth, the effective portion of said cutting edge terminating short of the head.

19. A screw threaded fastener for use in metal work and the like, including a hardened threaded body provided with a multiple thread, said multiple thread extending over substantially the entire extent of the screw body and having a uniform V-shaped crown cross-section, said screw body having a non-burrowing entering end and at least one of the threads on said body decreasing in diameter toward the entering end of the body to facilitate the application thereof to an aperture of a work piece.

20. A screw threaded fastener for use in metal work and the like, including a hardened threaded body provided with a multiple thread, said multiple thread extending over substantially the entire extent of the screw body, said screw body having a non-burrowing entering end, the crest of one thread being diametrically positioned opposite the crest of another thread whereby said crests cooperate to lend support at diametrically opposite points to prevent canting of the screw when it is initially inserted within an unthreaded aperture.

21. A self-threading screw fastener including an elongated body having a threaded holding portion and a hardened non-burrowing thread forming portion at one extremity thereof, and a head connected with the opposite extremity of said body, the thread along the holding and thread forming portions being uniformly V-shaped in crown cross-section and extending from the vicinity of the head to the entering end of the fastener, the thread on the thread forming portion decreasing in external diameter toward the entering end to facilitate its initial application to an unthreaded aperture in a relatively hard work piece, the thread on said holding portion being of a machine screw type.

22. A self-threading screw fastener including an elongated body having a threaded holding portion and a hardened non-burrowing thread forming portion at one extremity thereof, and a head connected with the opposite extremity of said body, the thread along the holding and thread forming portions being V-shaped in cross-section and extending from the vicinity of the head to the entering end of the fastener, the thread on the thread forming portion decreasing in external diameter toward the entering end to facilitate its initial application to an unthreaded aperture in a relatively hard work piece, the thread on said holding and thread forming portions being substantially uniform in height.

CARL G. OLSON.